(12) United States Patent
Sako et al.

(10) Patent No.: US 9,064,399 B2
(45) Date of Patent: Jun. 23, 2015

(54) INFORMATION PROCESSING DEVICE, INFORMATION PROCESSING METHOD, AND PROGRAM

(71) Applicant: SONY CORPORATION, Tokyo (JP)

(72) Inventors: Yoichiro Sako, Tokyo (JP); Akira Tange, Tokyo (JP); Kazutoshi Serita, Tokyo (JP); Toru Yamamuro, Tokyo (JP); Yuki Koga, Tokyo (JP); Katsumi Ando, Tokyo (JP); Makoto Morishita, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/799,717

(22) Filed: Mar. 13, 2013

(65) Prior Publication Data

US 2013/0271285 A1 Oct. 17, 2013

(30) Foreign Application Priority Data

Apr. 16, 2012 (JP) ................................. 2012-092874

(51) Int. Cl.
*G08B 21/00* (2006.01)
*G08B 21/18* (2006.01)
*B60L 11/18* (2006.01)

(52) U.S. Cl.
CPC ........... *G08B 21/182* (2013.01); *B60L 11/1861* (2013.01); *B60L 2250/16* (2013.01); *Y02T 10/7044* (2013.01); *Y02T 10/7005* (2013.01); *Y02T 10/705* (2013.01)

(58) Field of Classification Search
CPC .................................................. B60K 2350/1092
See application file for complete search history.

(56) References Cited

U.S. PATENT DOCUMENTS

| 5,916,298 | A | * | 6/1999 | Kroiss et al. | 701/123 |
| 5,951,621 | A | * | 9/1999 | Palalau et al. | 340/995.2 |
| 6,321,160 | B1 | * | 11/2001 | Takahashi | 701/410 |
| 7,237,203 | B1 | * | 6/2007 | Kuenzner | 715/764 |
| 2007/0176762 | A1 | * | 8/2007 | Aoyagi et al. | 340/439 |
| 2007/0208468 | A1 | * | 9/2007 | Sankaran et al. | 701/29 |
| 2007/0245578 | A1 | * | 10/2007 | Clark et al. | 33/365 |
| 2009/0243827 | A1 | * | 10/2009 | Burke et al. | 340/439 |
| 2012/0176231 | A1 | * | 7/2012 | Skaff et al. | 340/439 |

FOREIGN PATENT DOCUMENTS

JP 2005-164250 6/2005

* cited by examiner

*Primary Examiner* — Curtis King
(74) *Attorney, Agent, or Firm* — Sony Corporation

(57) ABSTRACT

There is provided an information processing device including a characteristic detection unit that detects a characteristic of a battery and a characteristic of an operating device that operates using electric power obtained from the battery, a symbol setting unit that sets one symbol on which information corresponding to the detected characteristics is reflected, and a display control unit that causes the set symbol to be displayed.

11 Claims, 10 Drawing Sheets

FIG. 3
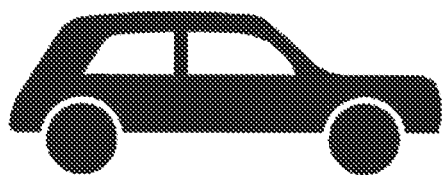
REMAINING TRAVEL DISTANCE 100km
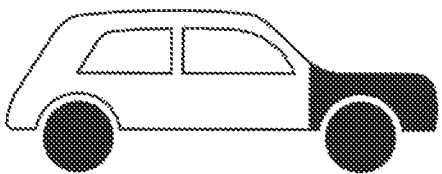
REMAINING TRAVEL DISTANCE 30km

INFORMATION PROCESSING DEVICE, INFORMATION PROCESSING METHOD, AND PROGRAM

BACKGROUND

The present disclosure relates to an information processing device, an information processing method, and a program.

As a method for notifying users of various states, for example, a method for displaying a symbol such as an icon in a display region such as a display screen, or the like is exemplified. As a technology of displaying the remaining capacity of a battery in stages, for example, the technology described in JP 2005-164250A is exemplified.

SUMMARY

As described in, for example, JP 2005-164250A, users can ascertain the remaining capacity of a battery by causing the remaining capacity of a battery to be displayed in stages. However, states that users desire to ascertain are not limited to the characteristic of a battery such as the remaining capacity thereof, and users also want to ascertain, for example, the characteristics of a device that operates using electric power obtained from a battery (which may hereinafter be referred to as an "operating device").

In the present disclosure, a novel and improved information processing device, information processing method, and program which can allow users to ascertain information indicating such characteristics of a battery and an operating device that operates using electric power obtained from the battery using one symbol will be proposed.

According to an embodiment of the present disclosure, there is provided an information processing device including a characteristic detection unit that detects a characteristic of a battery and a characteristic of an operating device that operates using electric power obtained from the battery, a symbol setting unit that sets one symbol on which information corresponding to the detected characteristics is reflected, and a display control unit that causes the set symbol to be displayed.

Further, according to an embodiment of the present disclosure, there is provided an information processing method including detecting a characteristic of a battery and a characteristic of an operating device that operates using electric power obtained from the battery, setting one symbol on which information corresponding to the detected characteristics is reflected, and causing the set symbol to be displayed.

Further, according to an embodiment of the present disclosure, there is provided a program for causing a computer to execute detecting a characteristic of a battery and a characteristic of an operating device that operates using electric power obtained from the battery, setting one symbol on which information corresponding to the detected characteristics is reflected, and causing the set symbol to be displayed.

According to the embodiments of the present disclosure described above, users can ascertain information indicating the characteristics of a battery and an operating device that operates using electric power obtained from the battery using one symbol.

BRIEF DESCRIPTION OF THE DRAWINGS

FIG. 3 is an illustrative diagram showing a third example of the symbol set in the symbol setting process according to the embodiment;

DETAILED DESCRIPTION OF THE EMBODIMENT(S)

Figure 1:
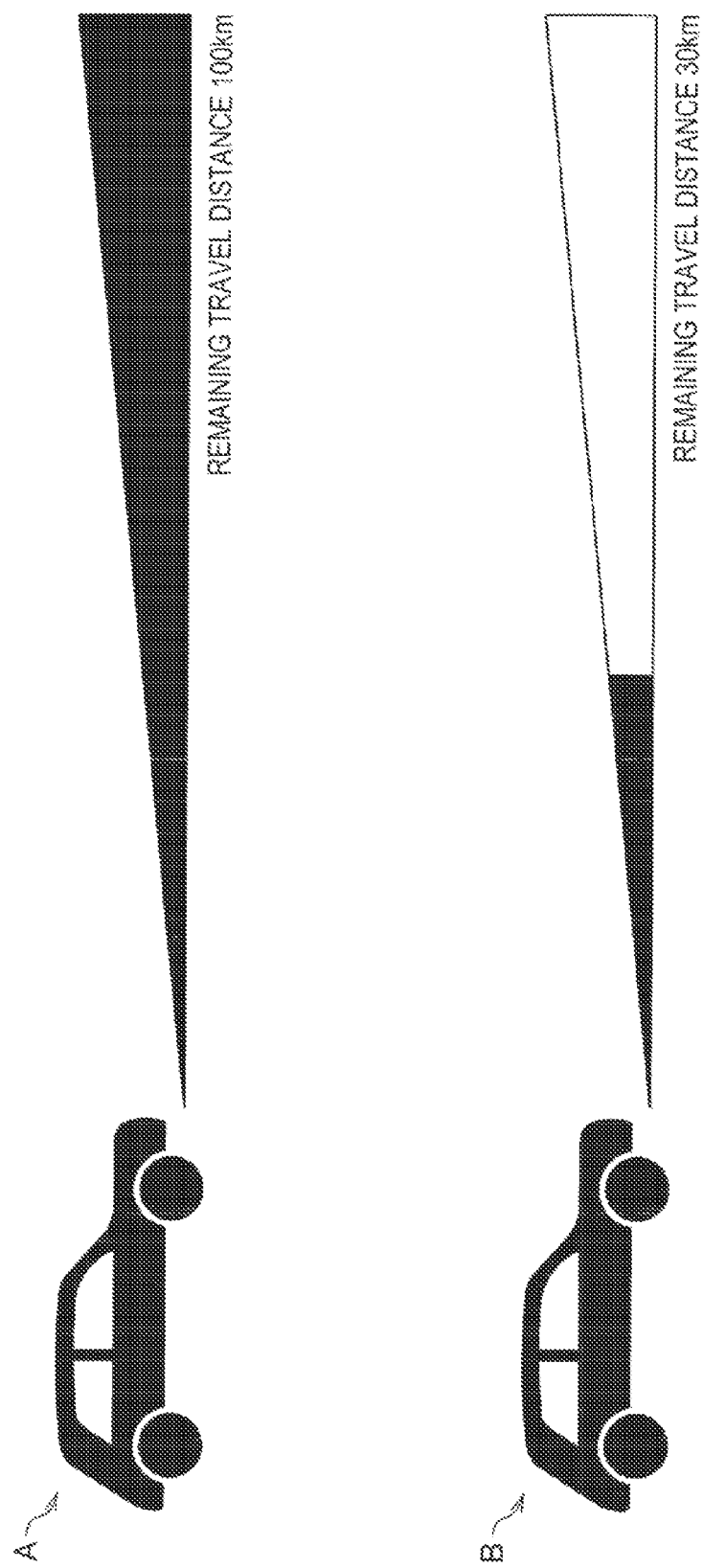
FIG. 1 is an illustrative diagram showing a first example of a symbol set in a symbol setting process according to an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, hereinafter, description will be provided in the order shown below.

1. Information Processing Method According to Present Embodiment
2. Information Processing Device According to Present Embodiment
3. Program According to Present Embodiment

[Information Processing Method According to Present Embodiment]

Before a configuration of an information processing device according to the present embodiment is described, an information processing method according to the present embodiment will be described first. Hereinbelow, the information processing method according to the present embodiment will be described by exemplifying a case in which the information processing device according to the present embodiment performs processes relating to the information processing method according to the present embodiment.

In addition, hereinbelow, description will be provided by exemplifying a case in which the information processing device according to the present embodiment is an operating device that operates using electric power obtained from a battery, and the information processing device according to the present embodiment is a moving object such as a vehicle. Note that the information processing device according to the present embodiment is not limited to an operating device. The information processing device according to the present embodiment may be, for example, a battery that supplies power to an operating device, or may be an external device that serves as an operating device. In addition, an operating device according to the present embodiment is not limited to a moving object.

The information processing device according to the present embodiment detects characteristics of a battery and an operating device that operates using electric power obtained from the battery (detection process). In addition, the information processing device according to the present embodiment sets one symbol (symbol setting process) in which information corresponding to the detected characteristics is reflected. Then, the information processing device according to the present embodiment causes the set symbol to be displayed (display control process).

Herein, as a symbol set by the information processing device according to the present embodiment, for example, an image such as an icon is exemplified. Note that such a symbol set by the information processing device according to the present embodiment is not limited to the above. For example, such a symbol set by the information processing device according to the present embodiment may be a display control pattern for realizing visual notification of the characteristics for users such as a light emitting pattern of a light emitting element including an LED (Light Emitting Diode) that is included in a display region. When the symbol set by the information processing device according to the present embodiment is a display control pattern, the symbol is displayed in a display region such as a display screen using the set display control pattern. Consequently, a display control pattern according to the present embodiment corresponds to, for example, a pattern indirectly indicating a symbol.

Thus, the symbol set by the information processing device according to the present embodiment may be an item such as an icon directly indicating the symbol, or a display control pattern according to the present embodiment indirectly indicating the symbol.

(1) Detection Process

The information processing device according to the present embodiment detects the characteristics of a battery and an operating device.

Herein, as the characteristics of a battery detected by the information processing device according to the present embodiment, for example, the type, the capacity, the remaining capacity of the battery, and the like are exemplified. Note that the characteristics of the battery according to the embodiment are not limited thereto. The information processing device according to the present embodiment may detect, for example, the degree of deterioration of the battery, or the type of electric power stored in the battery (for example, whether it is eco-friendly electric power or not) as the characteristics thereof.

In addition, as the characteristics of an operating device detected by the information processing device according to the present embodiment, for example, the type of the operating device, consumption power consumed during the drive of the operating device, and the like are exemplified. Note that the characteristics of the operating device according to the present embodiment are not limited thereto. The information processing device according to the present embodiment may detect, for example, specifications of an operating device such as a maximum operating time, and a maximum movable distance thereof (if the operating device is a moving object) as the characteristics thereof.

(1-1) Example of Detection Process Relating to Characteristics of Battery

The information processing device according to the present embodiment detects, for example, the type and/or the capacity of a battery by specifying the type and/or the capacity of the battery based on identification data corresponding to the battery which is acquired from the battery serving as a detection target. Herein, the identification data corresponding to the battery according to the present embodiment is data that can be used in identifying the battery. As the identification data corresponding to the battery according to the present embodiment, for example, data indicating an identification number unique to the battery, data indicating the type thereof (for example, data indicating the manufacturer, the model number, or the like), electric power waveform data indicating the waveform of electric power output from the battery, and the like are exemplified. Note that, if identification data corresponding to a battery according to the present embodiment is data that can be used in identifying the battery, it is not limited to the above examples.

In addition, the information processing device according to the present embodiment acquires, for example, data indicating voltage values and current values of a battery serving as a detection target and then estimates the remaining capacity of the battery so as to detect the remaining capacity thereof based on such acquired various kinds of data. Note that a method for estimating the remaining capacity of a battery using the information processing device according to the present embodiment is not limited to the above. The information processing device according to the present embodiment can also estimate the remaining capacity of a battery using an arbitrary method in which the remaining capacity thereof is estimated by, for example, setting a value of the remaining capacity corrected using a plurality of indexes (for example, a voltage value and a current value) as an estimation result of the remaining capacity of the battery, or the like.

In addition, the information processing device according to the present embodiment detects the degree of deterioration of a battery by, for example, acquiring history data indicating a use history of the battery serving as a detection target (for example, data indicating a use starting date and time, data indicating a cumulative time for which the battery is charged or discharged, or the like), and then estimating the degree of deterioration thereof based on the acquired history data. More specifically, when history data is the data indicating a use starting date or time, for example, the information processing device according to the present embodiment estimates the degree of deterioration of a battery through a threshold value process using the time interval between a current date and time and the use starting date and time indicated by the history data and a threshold value which is 1, 2, or higher. In addition, when the history data is data indicating a cumulative time for which a battery is discharged, for example, the information processing device according to the present embodiment estimates the degree of deterioration of the battery through a threshold value process using the cumulative time indicated by the history data and a threshold value which is 1, 2, or higher. Note that a method for estimating the degree of deterioration of a battery according to the present embodiment is not limited to the above. The information processing device according to the present embodiment can also estimate the degree of deterioration of a battery using an arbitrary method that can estimate the degree of deterioration thereof based on, for example, a change in an internal resistance value of the battery serving as a detection target (for example, an increase in the internal resistance value in comparison to a reference value), or a change in the capacity of the battery when it is fully charged (for example, a decrease in the capacity thereof in comparison to a reference capacity).

When a battery serving as a detection target is not the device (information processing device according to the present embodiment) itself, the information processing device according to the present embodiment performs, for example, communication with the battery serving as a detection target so as to acquire various kinds of data relating to detection of the characteristics the battery therefrom and then to detect the characteristics. In addition, when a battery serving as a detection target is the device (information processing device according to the present embodiment) itself, the information processing device according to the present embodiment detects the characteristics thereof by reading various kinds of data or identification data stored in a recording medium from various devices (for example, a voltage detector, and the like) that detect the various kinds of data relating to detection of the characteristics. Note that it is needless to say that the example of a detection process of the characteristics of a battery using the information processing device according to the present embodiment is not limited to the above examples.

(1-2) Example of Detection Process Relating to Characteristics of Operating Device The information processing device according to the present embodiment detects, for example, the type of an operating device and/or consumption power consumed during drive thereof by specifying the type of the operating device and/or consumption power consumed during the drive thereof based on identification data corresponding to the operating device which is acquired from the operating device serving as a detection target. Herein, the identification data corresponding to the operating device according to the present embodiment is data that can be used in identifying the operating device. As the identification data corresponding to the operating device according to the present embodiment, for example, data indicating an identification number unique to the operating device, data indicating the type thereof (for example, data indicating the manufacturer, the model number, or the like), electric power waveform data indicating the waveform of electric power during use of the operating device (during drive thereof), and the like are exemplified. Note that, if identification data corresponding to an operating device according to the present embodiment is data that can be used in identifying the operating device, it is not limited to the above examples.

More specifically, when the acquired identification data is data indicating the type of the operating device, for example, the information processing device according to the present embodiment specifies the type of the operating device based on the data indicating the type thereof. In addition, when the acquired identification data is data indicating an identification number, or electric power waveform data, for example, the information processing device according to the present embodiment specifies the type of the operating device and/or consumption power consumed during drive thereof using, for example, a table in which the content of the above data is associated with the type and/or the consumption power of the operating device. Note that it is needless to say that a process of detecting the characteristics of an operating device based on identification data in the information processing device according to the present embodiment is not limited to the above.

(2) Symbol Setting Process

The information processing device according to the present embodiment sets one symbol in which information corresponding to the characteristics detected in the process (1) (detection process) described above is reflected. The information processing device according to the present embodiment specifies the information corresponding to the characteristic detected in the process (1) (detection process) described above, and then sets one symbol in which the specified information is reflected.

Herein, as the information corresponding to the characteristics according to the present embodiment, the information indicating the characteristics detected in the process (1) (detection process) described above, for example, the type, the remaining capacity, and the degree of deterioration of a battery, the type and consumption power of an operating device, and the like are exemplified.

Note that the information corresponding to the characteristics according to the present embodiment is not limited to the above. For example, information indicating a time for which an operating device can move using electric power obtained from a battery, and/or a distance which an operating device can move using electric power obtained from a battery may be included in the information corresponding to the characteristics according to the present embodiment. In the information corresponding to the characteristics according to the present embodiment, for example, one, or two or more kinds of information out of the above described information are included. In addition, the information processing device according to the present embodiment sets one symbol in which the one or two or more kinds of information corresponding to the detected characteristics are reflected.

When the characteristics detected in the process (1) (detection process) described above are not set as information corresponding to the characteristics according to the present embodiment, the information processing device according to the present embodiment computes (or estimates) a time for which an operating device can move using electric power obtained from a battery or a distance which an operating device can move using electric power obtained from the battery based on the detected characteristics of the battery including, for example, the remaining capacity, the degree of deterioration thereof, and the like and the characteristics of the operating device including the type of the operating device, consumption power consumed during drive thereof, and the like. Then, the computed (or estimated) time or distance is set as information corresponding to the characteristics according to the present embodiment. Herein, the information processing device according to the present embodiment computes (or estimates) the time for which the operating device can move based on, for example, the remaining capacity of the battery specified (or estimated) from the characteristics of the battery and the consumption power of the operating device specified (or estimated) from the characteristics of the operating device. In addition, the information processing device according to the present embodiment computes (or estimates) the distance which the operating device can move based on, for example, the computed (or estimated) time for which the operating device can move and the speed of the moving object (for example, the current speed, the reference speed, or the like).

In addition, in the information corresponding to the characteristics according to the present embodiment, for example, one or two or more kinds of information out of information set in advance corresponding to each characteristic detected in the process (1) (detection process) described above, information obtained by changing the information set in advance, and information newly set based on a user operation may be included.

Herein, as the information set in advance corresponding to each characteristic according to the present embodiment, for example, an icon (an example of a symbol) associated with each detected characteristic is exemplified. When a characteristic of an operating device detected in the process (1)

(detection process) described above indicates the type of the operating device, an icon indicating the external shape of the operating device corresponding to the type thereof corresponds to an example of the information set in advance corresponding to a characteristic.

Note that the information set in advance corresponding to a characteristic is not limited to an icon indicating the external shape of an operating device corresponding to the type thereof. When the operating device is an automobile (an example of a moving object), for example, the information set in advance corresponding to a characteristic may be an icon corresponding to the manufacturer specified based on the type of the operating device, an icon corresponding to the type of the automobile (for example, a sedan, a wagon, a sport car, a two-seater car, a light car, or the like) specified based on the type of the operating device, or an icon indicating the model of the automobile specified based on the type of the operating device. In addition, the information set in advance corresponding to a characteristic may be an icon corresponding to a characteristic other than the type of the operating device, for example, an icon indicating the appearance of a battery corresponding to the type of the battery, or the like. Further, the information set in advance corresponding to a characteristic is not limited to an icon, and may be a display control pattern (an example of a symbol) according to the present embodiment such as a light emitting pattern of a light emitting element such as an LED that is included in a display region.

The information processing device according to the present embodiment acquires the information set in advance corresponding to a characteristic according to the present embodiment from, for example, a recording medium such as a storage unit (to be described later) provided in the information processing device according to the present embodiment, an external recording medium that can be attached to or detached from the information processing device according to the present embodiment, a server connected thereto in a wired or wireless manner, or an external device such as a device that a user owns. Herein, as the server in which the information set in advance corresponding to a characteristic according to the present embodiment is stored, for example, a server of the manufacturer of an operating device, a server that provides an SNS (Social Networking Service), or the like is exemplified.

Herein, the information processing device according to the present embodiment automatically acquires the information set in advance corresponding to a characteristic according to the present embodiment based on, for example, the characteristic detected in the process (1) (detection process) described above. More specifically, when the information set in advance corresponding to a characteristic according to the present embodiment is acquired from the storage unit (to be described later) or a connected external device, the information processing device according to the present embodiment acquires the information set in advance corresponding to the characteristic according to the present embodiment by, for example, searching the storage unit (to be described later) for information corresponding to the detected characteristic. In addition, when information set in advance corresponding to a characteristic according to the present embodiment is acquired from an external device, the information processing device according to the present embodiment acquires the information set in advance corresponding to the characteristic according to the present embodiment by, for example, transmitting an information transmission request to the external device in accordance with the detection of the characteristic. For the information transmission request according to the present embodiment, for example, data including data indicating the detected characteristic (for example, data indicating the type of a battery, the type of an operating device, or the like) and a transmission command that causes information corresponding to the characteristic to be transmitted are exemplified.

Note that a method for acquiring the information set in advance corresponding to a characteristic according to the present embodiment is not limited to the above. For example, the information processing device according to the present embodiment can also acquire information set in advance corresponding to one or two or more characteristics according to the present embodiment out of information set in advance corresponding to a plurality of characteristics (for example, an image indicating an icon, or the like) according to the present embodiment based on a user operation such as a selection operation by a user.

In addition, as information obtained by changing the information set in advance according to the present embodiment, for example, an icon or a display control pattern which is obtained by a user customizing an icon or a display control pattern associated with each detected characteristic is exemplified. When, an operation signal based on a user operation (for example, a selection operation, an input operation, or the like relating to the change of an icon or a display control pattern) transmitted from an operation unit (to be described later) or based on a user operation transmitted from an external operation device such as a remote controller is detected, for example, the information processing device according to the present embodiment changes the icon or the display control pattern associated with each characteristic based on the operation signal. By enabling the change of the icon or the display control pattern based on the user operation, the user can set a symbol that he or she desires, for example, a symbol including an icon or a display control pattern of a desired car model, in the information processing device according to the present embodiment.

Note that the information obtained by changing the information set in advance according to the present embodiment is not limited to information changed based on a user operation. For example, the information processing device according to the present embodiment may change an icon or a display control pattern associated with each characteristic based on a change in a configuration of an operating device (for example, when the operating device is an automobile, when a wheel thereof is replaced, or the like). The information processing device according to the present embodiment periodically or non-periodically acquires data indicating a configuration of an operating device from, for example, the operating device or an external device that manages the configuration of the operation device, and by comparing data indicating the configuration thereof acquired in this time to data indicating the configuration thereof acquired in the previous time, and then detects a change in the configuration of the operating device. Then, when a change in the configuration of the operating device is detected, the information processing device according to the present embodiment changes an icon or a display control pattern associated with each characteristic based on the comparison result. As an example of a change in an icon or a display control pattern associated with each characteristic, when the operating device is an automobile and a wheel thereof is detected to be replaced, a portion corresponding to wheels in the icon or the display control pattern set in advance may be changed to a shape or a display control pattern corresponding to the replaced wheel.

In addition, as the information newly set based on a user operation according to the present embodiment, an icon or a display control pattern selected by a user, an icon designed by a user, or a display control pattern newly generated by a user is exemplified. When an operation signal based on a user operation transmitted from the operation unit (to be described later) (for example, a selection operation relating to new setting of an icon or a display control pattern, an input operation of a new icon or a new display control pattern, or the like) or an operation signal based on a user operation transmitted from an external operation device such as a remote controller, or the like is detected, for example, the information processing device according to the present embodiment newly sets an icon or a display control pattern based on the operation signal. By enabling new setting of an icon or a display control pattern based on a user operation, the user can set a symbol that he or she desires, for example, a symbol including an icon or a display control pattern of a desired car model in the information processing device according to the present embodiment.

The information processing device according to the present embodiment sets one symbol in which, for example, information corresponding to a detected characteristic as described above is reflected. A specific example of a symbol set by the information processing device according to the present embodiment will be described later.

Note that a process of setting a symbol in the information processing device according to the present embodiment is not limited to the above. When, for example, a change in a characteristic of a battery, or a change in a characteristic of an operating device is detected based on a characteristic detected in the process (1) (detection process) described above, the information processing device according to the present embodiment may update a set symbol based on the detected change in the characteristic. In other words, in setting of a symbol in the process of setting a symbol in the information processing device according to the present embodiment, new setting of a symbol (first setting of a symbol) and updating a set symbol are included.

Next, a specific example of a symbol set in the symbol setting process according to the present embodiment will be shown. Hereinbelow, description will be provided by exemplifying a case in which a symbol set in the symbol setting process according to the present embodiment is an icon. In addition, hereinbelow, an example of a symbol set in the symbol setting process according to the present embodiment will be shown by mainly exemplifying a case in which an operating device is an automobile (an example of a moving object).

(2-1) First Example of Symbol

FIG. 1 is an illustrative diagram showing a first example of a symbol set in the symbol setting process according to the present embodiment. Herein, A shown in FIG. 1 shows an example of a symbol set at first, and B shown in FIG. 1 shows an example of an updated symbol.

The information processing device according to the present embodiment sets an icon expressing a remaining travel distance (which corresponds to a distance which an operating device can move using electric power obtained from a battery, the same applies hereinafter) using an image of a light beam emitted from the headlight of an automobile (an example of the operating device) as a symbol as shown in, for example, FIG. 1. By setting the icon as shown in FIG. 1 as a symbol and displaying the symbol set in a display control process to be described later, a user can visually ascertain a remaining travel distance through the length of the light beam of the headlight expressed by the icon.

(2-2) Second Example of Symbol

Figure 2:
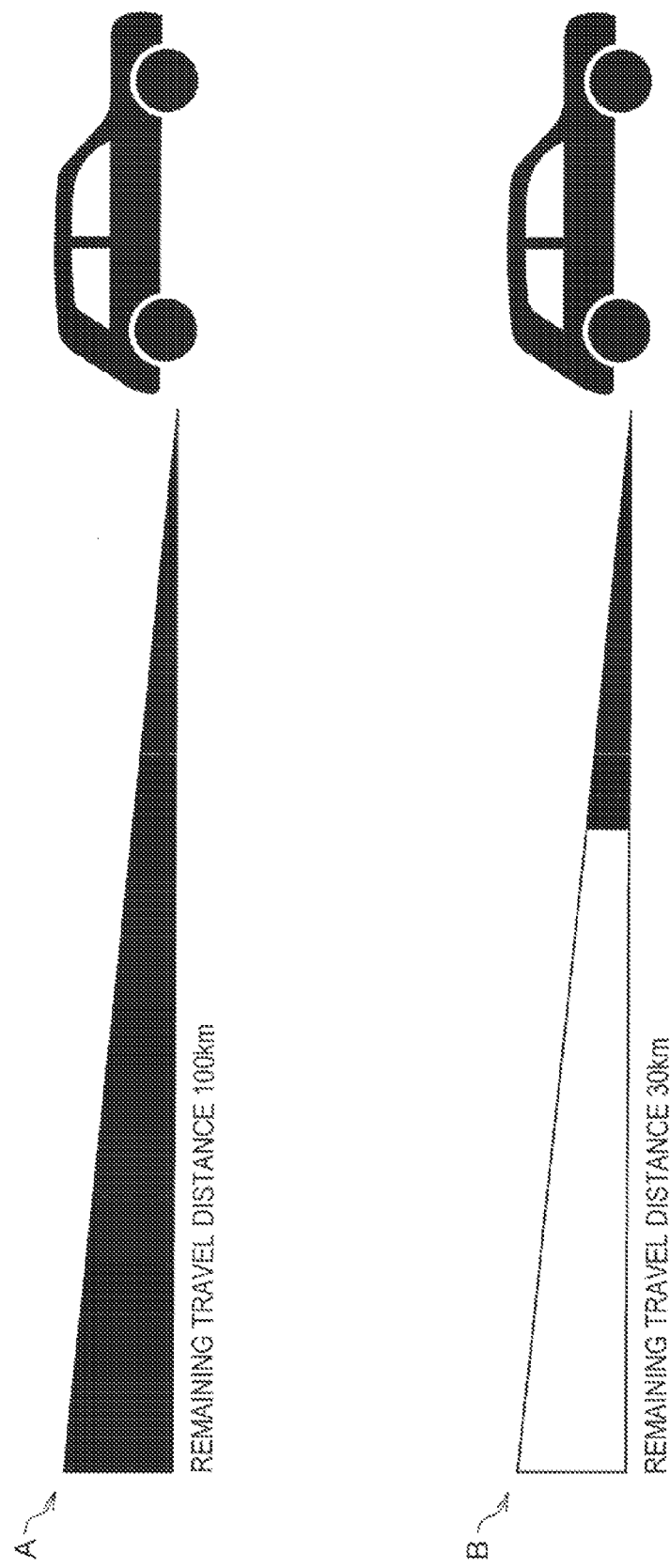
FIG. 2 is an illustrative diagram showing a second example of the symbol set in the symbol setting process according to the embodiment.

FIG. 2 is an illustrative diagram showing a second example of the symbol set in the symbol setting process according to the embodiment. Herein, A shown in FIG. 2 shows an example of a symbol set at first, and B shown in FIG. 2 shows an example of an updated symbol.

The information processing device according to the present embodiment sets an icon expressing a remaining travel distance using an image of emission gas of an automobile (an example of an operating device) as a symbol as shown in, for example, FIG. 2. By setting the icon as shown in FIG. 2 as a symbol and displaying the symbol set in the display control process to be described later, for example, a user can visually ascertain a remaining travel distance through the status of emission gas (for example, as the length thereof is short, it is possible to remind a user that the remaining distance is short).

(2-3) Third Example of Symbol

FIG. 3 is an illustrative diagram showing a third example of the symbol set in the symbol setting process according to the present embodiment. Herein, A shown in FIG. 3 shows an example of a symbol set at first, and B shown in FIG. 3 shows an example of an updated symbol.

The information processing device according to the present embodiment sets an icon expressing a remaining travel distance using a change in the body color of an automobile (an example of an operating device) as a symbol as shown in, for example, FIG. 3. By setting the icon as shown in FIG. 3 as a symbol and displaying the symbol set in the display control process to be described later, a user can visually ascertain a remaining travel distance through a change in the body color of the automobile in the icon.

(2-4) Fourth Embodiment of Symbol

The symbol set in the symbol setting process according to the present embodiment is not limited to the first to third examples described above. For example, the information processing device according to the present embodiment can also set an icon corresponding to each operating device based on the characteristics of a battery and of an operating device detected in the process (1) (detection process) described above.

Figure 4:
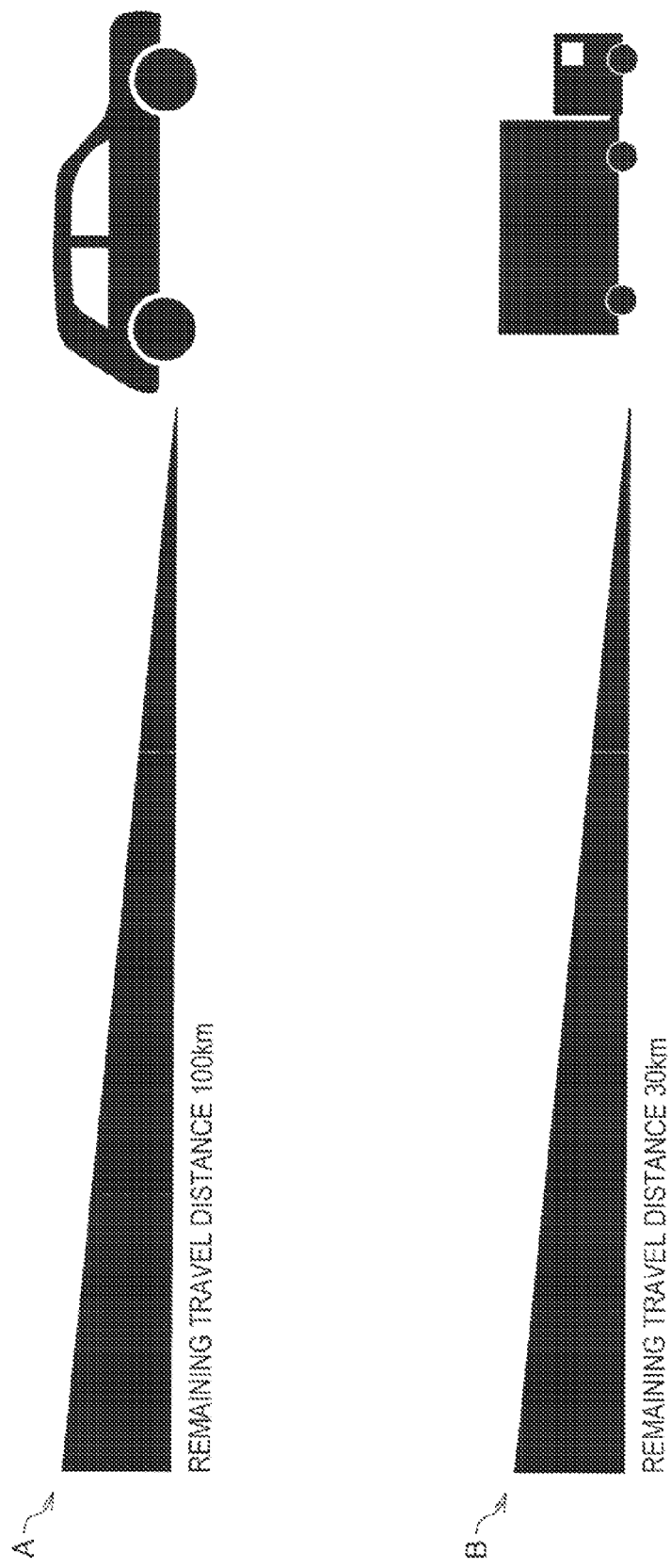
FIG. 4 is an illustrative diagram showing a fourth example of the symbol set in the symbol setting process according to the embodiment.

FIG. 4 is an illustrative diagram showing a fourth example of the symbol set in the symbol setting process according to the present embodiment. Herein, A shown in FIG. 4 shows an example of a symbol corresponding to an automobile (an example of an operating device), and B shown in FIG. 4 shows an example of a symbol corresponding to another automobile. In addition, FIG. 4 shows an example in which the symbols corresponding to each of the operating devices are expressed by the symbol relating to the second example described above.

The information processing device according to the present embodiment respectively sets the symbols including icons corresponding to characteristics detected in the process (1) (detection process) described above as shown in, for example, A and B of FIG. 4. In addition, the information processing device according to the present embodiment sets the symbols that include information of remaining travel distances respectively computed (or estimated) based on the characteristics in the process (1) (detection process) described above as shown in, for example, A and B of FIG. 4.

Herein, FIG. 4 shows an example in which the remaining travel distances computed (or estimated) with reference to a case in which, for example, "the remaining capacities of batteries that supply electric power to operating devices are equal to the capacities of the batteries" are expressed as symbols. As shown in FIG. 4, for example, the information processing device according to the present embodiment sets the symbols in which information corresponding to the characteristics detected in the process (1) (detection process) described above based on the reference relating to the batteries is reflected.

The information processing device according to the present embodiment sets the symbols in which the information corresponding to the characteristics detected based on the reference relating to the batteries is reflected, and displays the symbols set in the display control process to be described later as shown in, for example, FIG. 4. Thus, the information processing device according to the present embodiment can allow a user to ascertain information indicating characteristics of each battery and of each operating device based on the reference relating to the batteries of which the characteristics are to be detected using one symbol.

(2-5) Fifth Example of Symbol

In the fourth example of the symbol set in the symbol setting process, the example in which the information processing device according to the present embodiment sets a symbol in which information corresponding to a characteristic detected based on a reference relating to batteries is reflected has been described. However, the symbol set in the symbol setting process according to the present embodiment is not limited to the example in which a symbol in which information corresponding to a characteristic detected based on a reference relating to a battery is reflected is set. For example, the information processing device according to the present embodiment can also set a symbol in which information detected based on a reference that does not relate to a battery supplying electric power to an operating device is reflected. Herein, as the reference that does not relate to a battery supplying electric power to an operating device according to the present embodiment, for example, a reference value set in advance, or a reference value reset based on a user operation, or the like.

Figure 5:
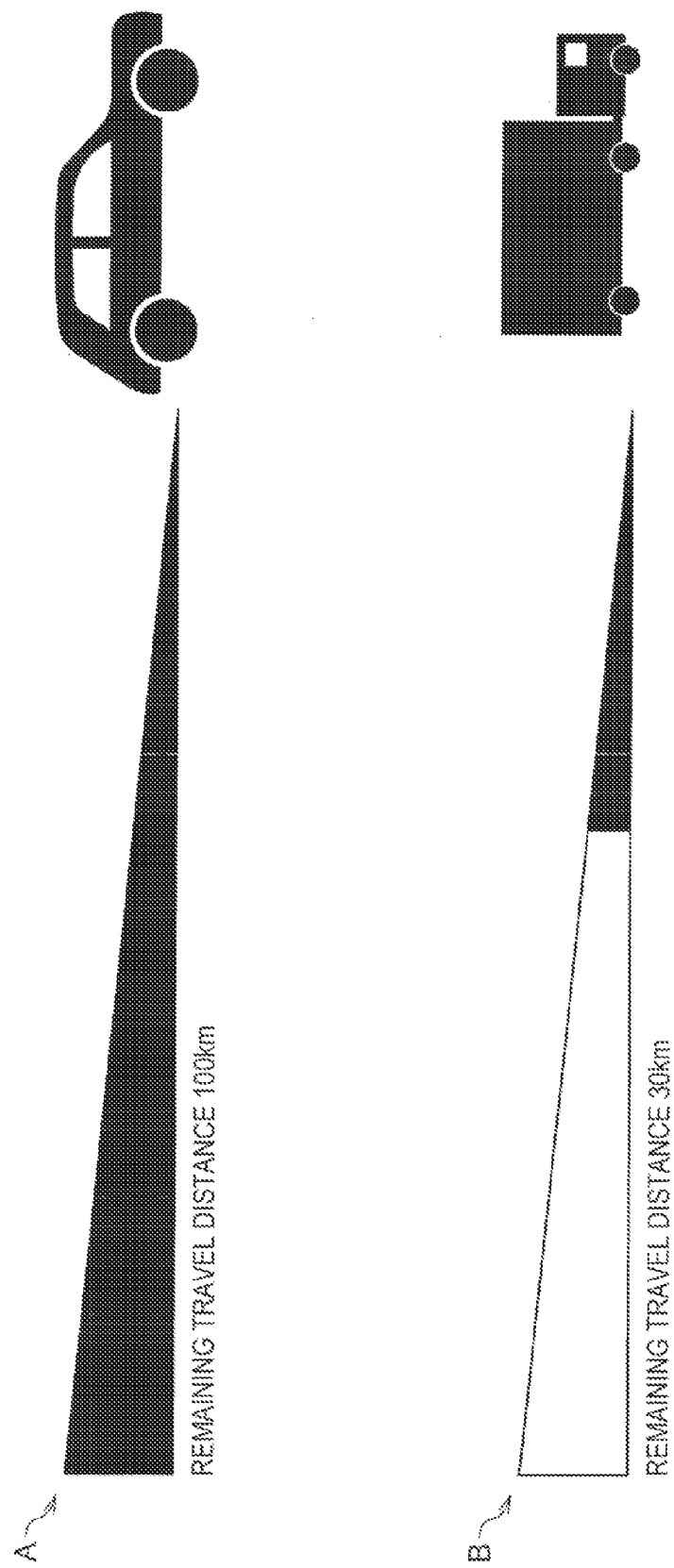
FIG. 5 is an illustrative diagram showing a fifth example of the symbol set in the symbol setting process according to the embodiment.

FIG. 5 is an illustrative diagram showing a fifth example of the symbol set in the symbol setting process according to the present embodiment. Herein, A shown in FIG. 5 shows an example of a symbol corresponding to an automobile (an example of an operating device) corresponding to A shown in FIG. 4, and B shown in FIG. 5 shows an example of a symbol corresponding to another automobile corresponding to B shown in FIG. 4. In addition, FIG. 5 shows an example in which the symbols corresponding to each operating device are expressed by the symbol relating to the second example above, in the same manner as in FIG. 4. In addition, FIG. 5 shows an example in which "a remaining travel distance of 100 [km]" is set as a reference.

When FIG. 4 and FIG. 5 are compared, it is ascertained that set symbols are different even though the remaining travel distances computed (or estimated) for the given operating device are equal to each other, for example, as shown in B of FIG. 4 and B of FIG. 5. As shown in FIG. 5, for example, the information processing device according to the present embodiment can also set a symbol in which information detected based on the reference that does not relate to a battery supplying electric power to the operating device is reflected, and display the symbol set in the display control process to be described later.

By the information processing device according to the present embodiment setting the symbol in which the information detected based on the reference that does not relate to a battery supplying electric power to the operating device is reflected as shown in, for example, FIG. 5, a user can ascertain information indicating a relative characteristic with respect to the set reference through one symbol. In the example shown in FIG. 5, a user can further instantaneously ascertain that the remaining travel distance is short even though the remaining capacity of the battery is close to full charge. In other words, for example, the fourth example shown in FIG. 4 shows that information indicating an absolute characteristic with respect to a reference relating to a battery supplying electric power to an operating device is expressed by one symbol, whereas the fifth example shown in FIG. 5 can be said to be an example in which information indicating a relative characteristic with respect to a reference that does not relate to a battery supplying electric power to an operating device is expressed by one symbol.

(2-6) Sixth Example of Symbol

In the first to fifth embodiments described above, the example in which the information processing device according to the present embodiment sets a symbol that includes an icon of an automobile corresponding to an operating device based on a characteristic of the operating device, for example, the detected type thereof, is shown, but the symbol set in the symbol setting process according to the present embodiment is not limited to the above examples. For example, the information processing device according to the present embodiment can also set a symbol that includes an icon corresponding to a battery based on a characteristic of the battery such as the detected type thereof.

Figure 6:
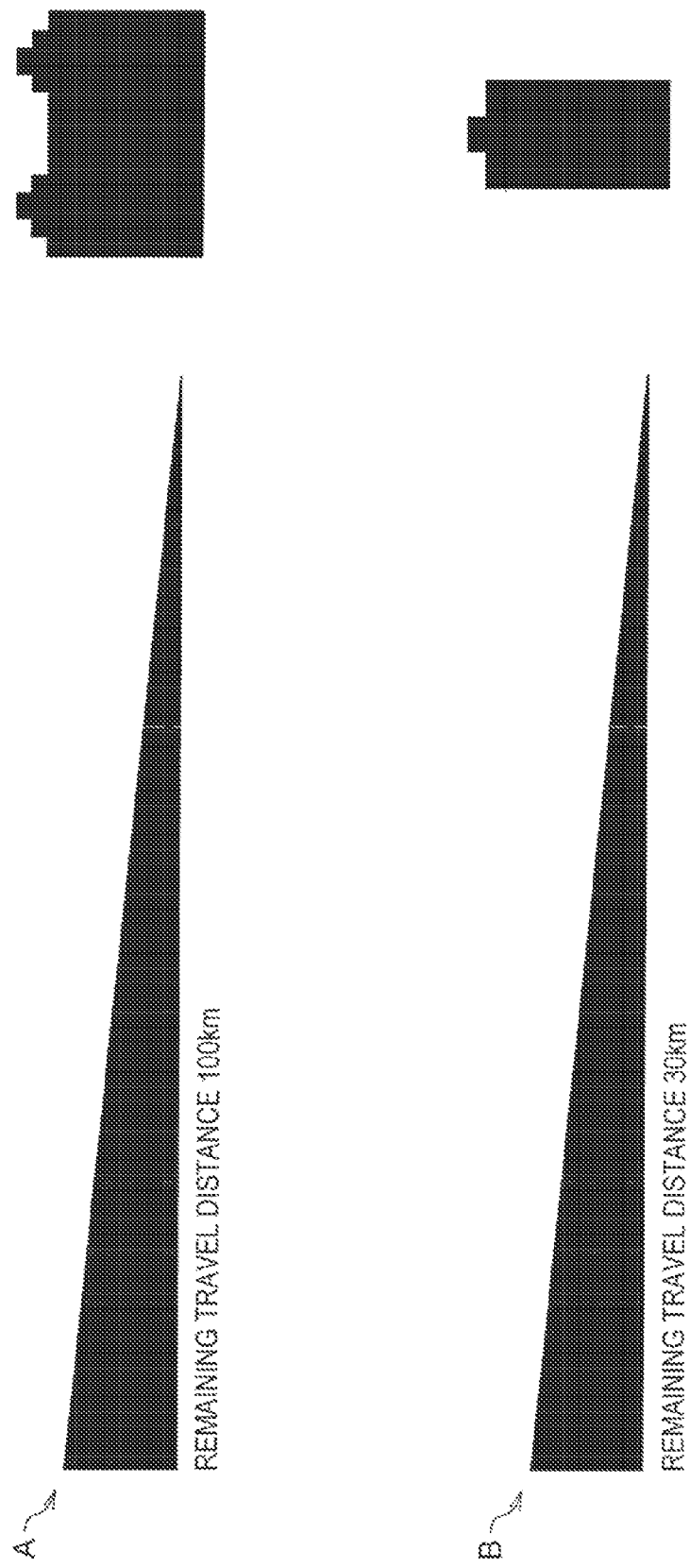
FIG. 6 is an illustrative diagram showing a sixth example of the symbol set in the symbol setting process according to the embodiment.

FIG. 6 is an illustrative diagram showing a sixth example of the symbol set in the symbol setting process according to the present embodiment. Herein, A shown in FIG. 6 shows an example of a symbol corresponding to a battery supplying electric power to an operating device, and B shown in FIG. 6 shows an example of a symbol corresponding to another battery supplying electric power to another operating device. In addition, FIG. 6 shows an example in which the symbols corresponding to each battery are expressed by the symbol relating to the second example described above.

As shown in FIG. 6, for example, even when the symbols that include icons corresponding to batteries are set, a user can visually ascertain remaining travel distances (an example of information corresponding to a detected characteristic) through indicators included in the symbol from display of the symbols set in the display control process to be described later.

(2-7) Seventh Example of Symbol

In the first to fifth examples described above, the example of a symbol set when an operating device is an automobile (an example of a moving object) is shown, but as described above, the operating device according to the present embodiment is not limited to an automobile. The information processing device according to the present embodiment can also set a symbol that includes various icons corresponding to operating devices based on the characteristics of the operating devices, for example, the detected types thereof.

Figure 7:
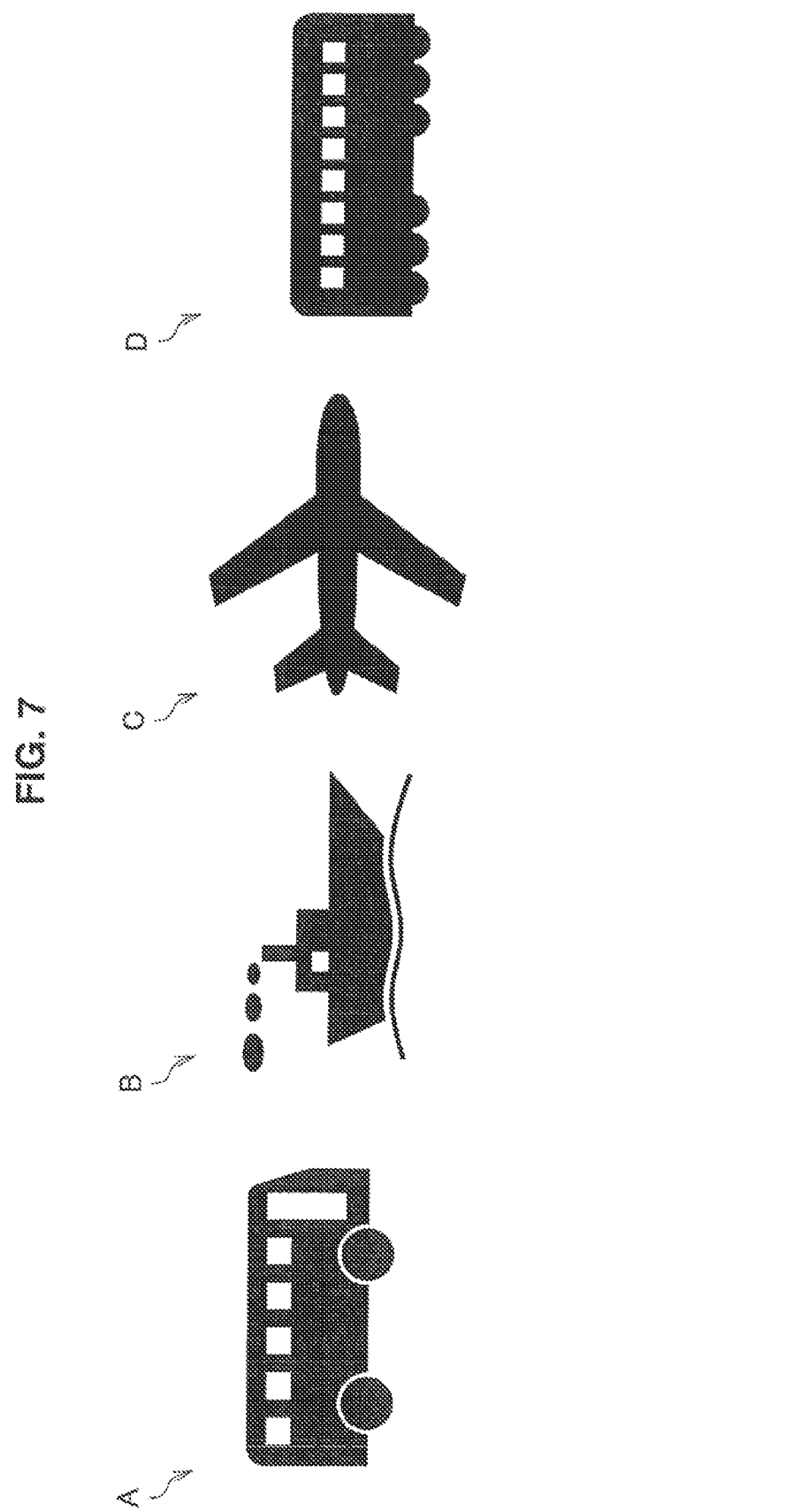
FIG. 7 is an illustrative diagram showing a seventh example of the symbol set in the symbol setting process according to the embodiment.

FIG. 7 is an illustrative diagram showing a seventh example of the symbol set in the symbol setting process according to the present embodiment, and shows each example of icons included in the set symbol. As shown in A to D of FIG. 7, the information processing device according to the present embodiment can include the icons of various moving objects corresponding to operating devices, for example, a bus, a ship, an airplane, or a tram in the symbol. Note that, in FIG. 7, an example that the operating devices according to the present embodiment are moving objects is shown, but operating devices according to the present embodiment are not limited to moving objects. For example, operating devices according to the present embodiment may include various devices including a computer such as a PC (Personal Computer), a communication device such as a mobile telephone or a smartphone which operate using electric power obtained from batteries, and the information processing device according to the present embodiment can include icons of such various devices corresponding to the operating device in a symbol.

(2-8) Other Examples of Symbol

The symbol set in the symbol setting process according to the present embodiment is not limited to the first to seventh examples described above. For example, the information processing device according to the present embodiment can also set a symbol including icons variously customized such as an icon designed by a user (an example of information newly set based on a user operation), and an icon obtained by changing an icon set in advance (an example of information obtained by changing information set in advance).

In addition, when the type of electric power (an example of characteristics of a battery) stored in a battery is included in detected characteristics, for example, the information processing device according to the present embodiment may change the color of a part or all of a symbol in accordance with the detected type of electric power stored in the battery. As an example in which color is changed, for example, a case in which a green symbol is set when electric power stored in a battery is eco-friendly, or a symbol in another color is set when power stored in the battery is not eco-friendly is exemplified.

In addition, the information processing device according to the present embodiment may set, for example a, dynamic symbol (for example, an icon expressed using a moving image, or the like). As a dynamic symbol according to the present embodiment, for example, a symbol of which the movement speed (updating speed) changes in accordance with information corresponding to a detected characteristic, such as the remaining capacity of a battery, a time for which an operating device can operate using electric power obtained from a battery, or a distance which an operating device can move using electric power obtained from a battery is exemplified. By setting a symbol of which the movement speed changes in accordance with information corresponding to a detected characteristic as described above, for example, the symbol can be displayed through the display control process to be described later in such a way that the icon of an automobile included in the symbol as shown in FIG. 1 moves faster as the remaining capacity of a battery is closer to full charge, and moves slower as the remaining capacity thereof is smaller. Herein, when the icon of the automobile included in the symbol moves in a lower speed, for example, an image in which the automobile runs sluggishly and staggeringly as if it runs out of gas can be presented to a user. Thus, by displaying such a dynamic symbol as described above, the information processing device according to the present embodiment can help the user easily ascertain information indicating characteristics of a battery and of an operating device through, for example, the movements of the symbol.

(3) Display Control Process

The information processing device according to the present embodiment causes a symbol set in the process (2) (symbol setting process) described above to be displayed.

Herein, as a target on which the information processing device according to the present embodiment causes a set symbol to be displayed, one or two or more display regions out of, for example, a display region on a display unit (to be described later) such as a display screen of the display unit (to be described later) included in the information processing device according to the present embodiment, a display region in an operating device of which a characteristic is to be detected, a display region in a battery of which a characteristic is to be detected, a display region in an external device associated with an operating device, and the like are exemplified.

A target on which the information processing device according to the present embodiment causes a set symbol to be displayed is, for example, set in advance, but such a target on which the information processing device according to the present embodiment causes a set symbol to be displayed is not limited to the above. For example, the information processing device according to the present embodiment may cause a set symbol to be displayed on a display region of a device set based on a user operation, or the like. Herein, as an external device associated with an operating device according to the present embodiment, for example, a communication device such as a mobile telephone, or a smartphone possessed by a user of the operating device, a PC, or the like is exemplified. Note that it is needless to say that an external device associated with an operating device according to the present embodiment is not limited to the above examples.

Note that the display control process performed in the information processing device according to the present embodiment is not limited to the above. For example, the information processing device according to the present embodiment may be caused to further perform a display to notify a user of a timing at which a battery is to be charged through a threshold value process using information corresponding to detected characteristics such as a remaining travel distance (a distance which an operating device can move using electric power obtained from a battery) or a time for which the operating device can operate using electric power obtained from a battery and a threshold value corresponding to each characteristic.

In addition, the information processing device according to the present embodiment may notify a user of a timing at which a battery is to be charged using sounds (including music) as well as or instead of performing a display to notify a user of a timing at which the battery is to be charged. As an example of notification, for example, a phrase "Charge the battery before xx:xx xx(month) xx(day), xxxx(year)," or the like is exemplified.

Herein, as a display to notify a user of a timing at which a battery is to be charged according to the present embodiment, for example, causing (a part or whole of) a set symbol to flicker, to change the color thereof, or the like is exemplified.

In addition, as a threshold value used to notify a user of a timing at which a battery is to be charged according to the present embodiment, a fixed value set in advance is exemplified, but the threshold value used to notify a user of a timing at which a battery is to be charged according to the present embodiment is not limited to the above. For example, the information processing device according to the present embodiment may adjust a threshold value used to notify a user of a timing at which the battery is to be charged based on the distance between a position of an operating device and a position of a place such as a power supplying stand where batteries can be charged. The information processing device according to the present embodiment computes the distance between the position of an operating device and the position of a place at which batteries can be charged based on data indicating a detection value of a sensor, for example, a GPS (Global Positioning System) device, or the like, that can be used in specifying a position of the operating device and position data indicating a place such as a power supplying stand where batteries can be charged. Then, the information processing device according to the present embodiment sets a threshold value corresponding to the computed distance based on, for example, the computed distance and a table in which the distance and the threshold value are associated.

Note that a method for adjusting the threshold value used to notify a user of a timing at which a battery is to be charged in the information processing device according to the present embodiment is not limited to the above. The information processing device according to the present embodiment may, for example, acquire data indicating the degree of complexity of a power supplying stand to an external device such as a server and adjust a threshold value used to notify a user of a timing at which the battery is to be charged based on the acquired data indicating the degree of complexity. By adjusting the threshold value used to notify the user of the timing at which the battery is to be charged based on the data indicating the degree of complexity as described above, for example, the user can be notified of a more appropriate timing at which the battery is to be charged.

The information processing device according to the present embodiment causes a set symbol to be displayed in a display region by transferring data (or a signal) indicating the symbol set in the process (2) (symbol setting process) described above to the display unit (to be described later), and/or by transmitting the data to an external device.

The information processing device according to the present embodiment performs, for example, the process (1) (detection process), the process (2) (symbol setting process), and the process (3) (display control process) which are described above as processes relating to an information processing method according to the present embodiment. Herein, the information processing device according to the present embodiment sets one symbol in which information corresponding to characteristics (the characteristics of a battery and an operating device that operates using electric power obtained from the battery) detected in the process (1) (detection process) described above is reflected in the process (2) (symbol setting process) described above. Then, the information processing device according to the present embodiment causes the set symbol to be displayed in the process (3) (display control process) described above.

Thus, the information processing device according to the present embodiment can allow a user to ascertain information indicating the characteristics of the battery and the operating device that operates using electric power obtained from the battery through one symbol.

Figure 8:
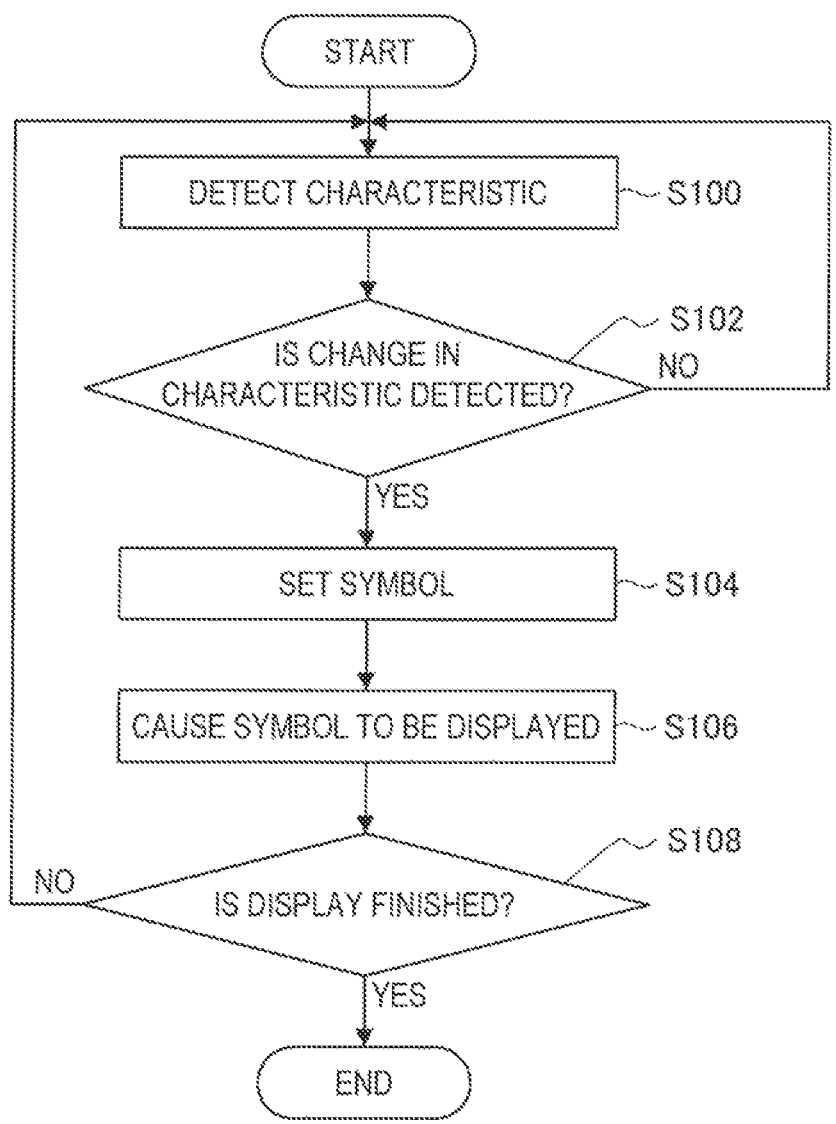
FIG. 8 is a flowchart showing an example of a process according to an information processing method in an information processing device according to the embodiment.

FIG. 8 is a flowchart showing an example of a process according to the information processing method in the information processing device according to the present embodiment. Herein, the process of Step S100 shown in FIG. 8 corresponds to the process (1) (detection process) described above, and the processes of Steps S102 and S104 shown in FIG. 8 correspond to the process (2) (symbol setting process) described above. In addition, the process of Step S106 shown in FIG. 8 corresponds to the process (3) (display control process) described above.

The information processing device according to the present embodiment detects a characteristic of a battery and a characteristic of an operating device, which are detection targets (S100). The information processing device according to the present embodiment detects the characteristics by, for example, performing the detection process relating to the characteristic of the battery shown in (1-1) described above and the detection process relating to the characteristic of the operating device shown in (1-2) described above.

When the characteristics are detected in Step S100, the information processing device according to the present embodiment determines whether or not a change in the characteristics is detected (S102). The information processing device according to the present embodiment, for example, compares the content of data indicating the characteristics detected currently to the content of data indicating characteristics detected a previous time, and when a difference between them is detected, it is determined that a change in the characteristics is detected. In addition, when data indicating the characteristics detected the previous time is not present (for example, during a first process), the information processing device according to the present embodiment determines that a change in the characteristics is detected.

When the change in the characteristics is determined not to be detected in Step S102, the information processing device according to the present embodiment repeats the processes from Step S100.

In addition, when the change in the characteristics is determined to be detected in Step S102, the information processing device according to the present embodiment sets one symbol in which information corresponding to the characteristics detected in Step S100 is reflected (S104). Then, the information processing device according to the present embodiment causes the symbol set in Step S104 to be displayed (S106).

When the process of Step S106 is performed, the information processing device according to the present embodiment determines whether or not the display is finished (S108). Herein, the information processing device according to the present embodiment determines to finish the display when, for example, a display finishing command to finish the display is included in an operating signal transferred from the operation unit (to be described later) according to a user operation. In addition, the information processing device according to the present embodiment may determine to finish the display when, for example, an operation of an operating device is finished (for example, when the operation devices is in a power-off state).

When the display is determined not to be finished in Step S108, the information processing device according to the present embodiment repeats the processes from Step S100. In addition, when the display is determined not to be finished in Step S108, the information processing device according to the present embodiment finishes the process relating to the information processing method according to the present embodiment.

The information processing device according to the present embodiment performs, for example, the process shown in FIG. 8 as a process relating to the information processing method. With the process shown in FIG. 8, the process (1) (detection process) to the process (3) (display control process) which are described above are realized. Thus, by performing the process shown in, for example, FIG. 8, the information processing device according to the present embodiment allows a user to ascertain information indicating a characteristic of a battery and a characteristic of an operating device that operates using electric power obtained from the battery through one symbol.

Note that the process relating to the information processing method by the information processing device according to the present embodiment is not limited to the process shown in FIG. 8. The information processing device according to the present embodiment may, for example, not perform the process of Step S102 shown in FIG. 8. When the process of Step S102 shown in FIG. 8 is not performed, the information processing device according to the present embodiment sets a symbol, for example, every time a characteristic is detected and causes the set symbol to be displayed. In addition, the information processing device according to the present embodiment may set a symbol based on, for example, a user operation so as to cause the set symbol to be displayed. By enabling a symbol to be set based on a user operation, for example, customizing a set symbol at an arbitrary timing is realized.

(Information Processing Device According to Present Embodiment)

Next, an example of a configuration of the information processing device according to the present embodiment which can perform the processes relating to the information processing method according to the present embodiment described above will be described. In addition, hereinbelow, an example of a configuration of the information processing device according to the present embodiment will be described exemplifying that the information processing device according to the present embodiment is an operating device that includes a battery.

Figure 9:
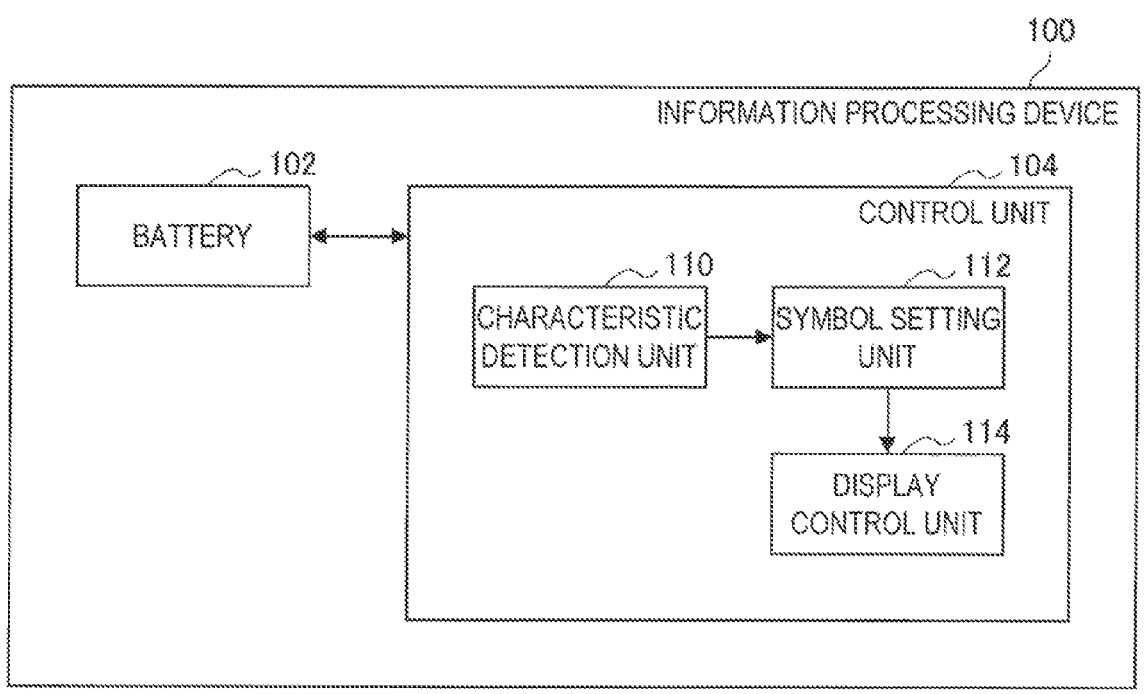
FIG. 9 is an illustrative diagram showing an example of a configuration of the information processing device according to the embodiment.

FIG. 9 is an illustrative diagram showing an example of a configuration of the information processing device 100 according to the present embodiment. The information processing device 100 includes, for example, a battery 102 and a control unit 104.

In addition, the information processing device 100 may include, for example, a ROM (Read Only Memory, not shown), a RAM (Random Access Memory, not shown), a storage unit (not shown), an operation unit (not shown) that a user can operate, a display unit (not shown) that displays various screens on a display screen, a communication unit (not shown), and the like. In the information processing device 100, the constituent elements are connected to one another via, for example, a bus as a transmission path for data.

Herein, the ROM (not shown) stores data for control such as a program that the control unit 104 uses, arithmetic operation parameters, and the like. The RAM (not shown) temporarily stores a program executed by the control unit 104, or the like.

The storage unit (not shown) is a storing portion included in the information processing device 100, and stores various kinds of data, for example, image data indicating an image (for example, an icon) that can configure a symbol according to the present embodiment, data indicating display control patterns, applications, and the like. Herein, as the storage unit (not shown), for example, a magnetic recording medium such as a hard disk, a non-volatile memory such as an EEPROM (Electrically Erasable and Programmable Read Only Memory), or a flash memory, or the like is exemplified. In addition, the storage unit (not shown) may be attached to or detached from the information processing device 100.

In addition, as the operation unit (not shown), an operation input device to be described below is exemplified, and as the display unit (not shown), a display device to be described below is exemplified. In addition, as the communication unit (not shown), for example, a communication interface to be described below is exemplified.

[Example of Hardware Configuration of Information Processing Device 100]

Figure 10:
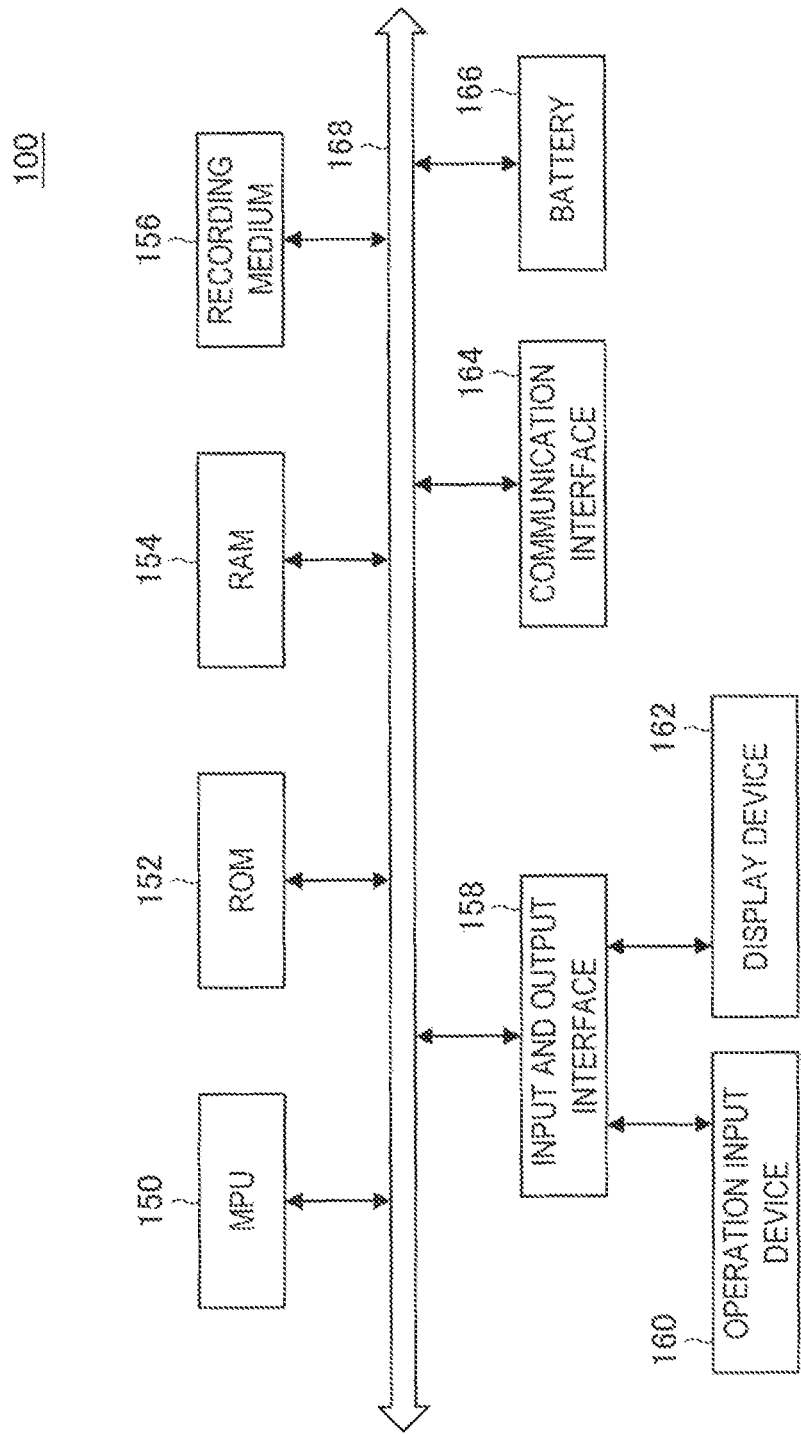
FIG. 10 is an illustrative diagram showing an example of a hardware configuration of the information processing device according to the embodiment.

FIG. 10 is an illustrative diagram showing an example of a hardware configuration of the information processing device 100 according to the present embodiment. The information processing device 100 includes, for example, an MPU 150, a ROM 152, a RAM 154, a recording medium 156, an input and output interface 158, an operation input device 160, a display device 162, a communication interface 164, and a battery 166. In addition, the information processing device 100 connects each of the constituent elements using, for example, a bus 168 as a transmission path for data.

The MPU 150 is configured of, for example, an MPU (Micro Processing Unit), various processing circuits, or the like, and functions as a control unit 104 that controls the whole information processing device 100. In addition, the MPU 150 plays roles of, for example, a characteristic detection unit 110, a symbol setting unit 112, and a display control unit 114 to be described later in the information processing device 100.

The ROM 152 stores data for control, and the like, such as programs, and arithmetic operation parameters that the MPU 150 uses. The RAM 154 temporarily stores, for example, programs executed by the MPU 150, and the like.

The recording medium 156 functions as a storage unit (not shown), and stores various types of data, for example, image data indicating an image that can be configured to be a symbol according to the present embodiment, data indicating a display control pattern, and applications. Herein, as the recording medium 156, for example, a magnetic recording medium such as a hard disk, and a non-volatile memory such as a flash memory are exemplified. In addition, the recording medium 156 may be attached to or detached from the information processing device 100.

The input and output interface 158 is connected to, for example, the operation input device 160 and the display device 162. The operation input device 160 functions as an operation unit (not shown), and the display device 162 functions as a display unit (not shown). Herein, as the input and output interface 158, for example, a USB (Universal Serial Bus) terminal, a DVI (Digital Visual Interface) terminal, an HDMI (High-Definition Multimedia Interface) terminal, various processing circuits, or the like is exemplified. In addition, the operation input device 160 is provided, for example, on the information processing device 100, and connected to the input and output interface 158 inside the information processing device 100. As the operation input device 160, for example, buttons, direction keys, a rotation type selector such as a jog dial, or a combination thereof, or the like is exemplified. In addition, the display device 162 is provided, for example, on the information processing device 100, and connected to the input and output interface 158 inside the information processing device 100. As the display device 162, for example, a liquid crystal display, an organic EL display (Organic Electroluminescence display, or also called an OLED display (Organic Light Emitting Diode Display)), or the like is exemplified.

Note that it is needless to say that the input and output interface 158 can also be connected to external devices such as the operation input device (for example, a keyboard, a mouse, and the like) or a display device as external devices of the information processing device 100. In addition, the display device 162 may be a device, for example, a touch screen, or the like on which display and user operations can be performed.

The communication interface 164 is a communication tool included in the information processing device 100, and functions as a communication unit (not shown) for conducting communication with an external device such as an external display device, or a server through a network (or directly) in a wired or wireless manner. Herein, as the communication interface 164, for example, a communication antenna and an RF (Radio Frequency) circuit (wireless communication), an IEEE802.15.1 port and a transmission and reception circuit (wireless communication), an IEEE802.11b port and a transmission and reception circuit (wireless communication), a LAN (Local Area Network) terminal and a transmission and reception circuit (wired communication), or the like is exemplified. In addition, as a network according to the present embodiment, for example, a wired network such as a LAN, or a WAN (Wide Area Network), a wireless network such as a wireless LAN (WLAN; Wireless Local Area Network), or a wireless WAN (WWAN; Wireless Wide Area Network) via a base station, or the Internet using communication protocols such as TCP/IP (Transmission Control Protocol/Internet Protocol), or the like is exemplified.

The battery 166 is a power source included in the information processing device 100, and supplies electric power to each device, for example, included in the information processing device 100. As the battery 166, for example, a primary battery, a secondary battery, or the like is exemplified. In addition, the battery 166 may be attached to or detached from the information processing device 100.

The information processing device 100 performs the processes relating to the information processing method according to the present embodiment in, for example, the configuration shown in FIG. 10. Note that the hardware configuration of the information processing device 100 according to the present embodiment is not limited to that shown in FIG. 10. If the information processing device 100 is configured to perform the process in a stand-alone manner, the device may not include the communication interface 164. In addition, the information processing device 100 can be configured not to include, for example, the operation input device 160 or the display device 162. In addition, the information processing device 100 may further include, for example, a DSP (Digital Signal Processor) and an audio output device. As the audio output device according to the present embodiment, for example, an amplifier (amp), a speaker, or the like is exemplified.

With reference to FIG. 9 again, an example of the configuration of the information processing device 100 will be described. The battery 102 is a power source included in the information processing device 100, and supplies electric power to each device, for example, included in the information processing device 100. As the battery 102, for example, a primary battery, a secondary battery, or the like is exemplified. In addition, the battery 102 may be attached to or detached from the information processing device 100.

The control unit 104 is configured of, for example, the MPU, various processing circuits, and the like, and plays a role of controlling the whole information processing device 100. In addition, the control unit 104 includes, for example, the characteristic detection unit 110, the symbol setting unit 112, and the display control unit 114, and plays a leading role of performing the processes relating to the information processing method according to the present embodiment.

The characteristic detection unit 110 plays a leading role of performing the process (1) (detection process) described above, and detects characteristics of the battery and an operating device that operates using electric power obtained from the battery. In the example shown in FIG. 9, the characteristic detection unit 110 detects a characteristic of the battery 102 as that of a battery, and a characteristic of the information processing device 100 as that of an operating device. In addition, the characteristic detection unit 110 transfers data (or a signal) indicating the detected characteristic to the symbol setting unit 112.

The symbol setting unit 112 plays a leading role of performing the process (2) (symbol setting process) described above, and sets one symbol in which information corresponding to the characteristic detected in the characteristic detection unit 110 is reflected. Herein, as a symbol set by the symbol setting unit 112, for example, a symbol in which information corresponding to a characteristic based on a reference relating to a battery is reflected as shown in FIG. 4, a symbol in which information corresponding to a characteristic based on a reference not relating to a battery is reflected as shown in FIG. 5, or the like is exemplified.

In addition, the symbol setting unit 112 may respectively detect changes in the characteristics of the battery and of the operating device based on, for example, data (or a signal) indicating the characteristics detected and then transferred from the characteristic detection unit 110. When the changes in the characteristics of the battery and of the operating device are detected, the symbol setting unit 112 updates the symbol based on the detected changes of the characteristics.

In addition, the symbol setting unit 112 transfers data (or a signal) indicating the set symbol to the display control unit 114.

The display control unit 114 plays a leading role of performing the process (3) (display control process) described above, and causes the symbol set in the symbol setting unit 112 to be displayed in set one, or two or more display regions (for example, a display region of the device set in advance, and/or a display region of the device set in a user operation, or the like). When a display unit (to be described later) is set as a display region in which the symbol is displayed, for example, the display control unit 114 causes the set symbol to be displayed in the display unit (to be described later) by transferring data (or a signal) indicating the set symbol to the display unit (to be described later). In addition, when a display region of an external device is set as a display region in which the symbol is displayed, for example, the display control unit 114 causes the set symbol to be displayed in the external device by causing the communication unit (not shown) to transmit the data (or signal) indicating the set symbol to the external device.

In addition, the display control unit 114 may selectively perform a display that notifies a user of a timing at which the battery 102 is to be charged through a threshold value process using, for example, information corresponding to a detected characteristic and a threshold value corresponding to each characteristic.

The control unit 104 performs a leading role in the processes relating to the information processing method according to the present embodiment by, for example, including the characteristic detection unit 110, the symbol setting unit 112, and the display control unit 114.

Note that the configuration of the control unit according to the present embodiment is not limited to the above. For example, the information processing device according to the present embodiment may individually include one, or two or more elements out of the characteristic detection unit 110, the symbol setting unit 112, and the display control unit 114 included in the control unit shown in FIG. 9 (or, for example, each element may be realized as an individual processing circuit).

The information processing device 100 performs the processes (for example, from the process (1) (detection process) to the process (3) (display control process) which are described above) relating to the information processing method according to the present embodiment in the configuration shown in, for example, FIG. 9. Thus, the information processing device 100 can allow a user to ascertain information indicating a characteristic of a battery and a characteristic of an operating device that operates using electric power obtained from the battery through one symbol in the configuration shown in, for example, FIG. 9.

Note that the configuration of the information processing device according to the present embodiment is not limited to that shown in FIG. 9. For example, FIG. 9 shows an example in which the information processing device according to the present embodiment is set to be an operating device that includes the battery 102, but the information processing device according to the present embodiment may operate using electric power supplied from a battery that is an external device, without including a battery. In a configuration in which a battery is not included, the processes relating to the information processing method according to the present embodiment are performed based on data indicating a characteristic of a battery (for example, the above-described identification data, or the like) acquired from the battery as an external device.

In addition, the information processing device according to the present embodiment may be, for example, a separate device from an operating device. When the information processing device according to the present embodiment is a separate device from an operating device, the information processing device according to the present embodiment performs the processes relating to the information processing method according to the present embodiment based on data indicating a characteristic of the operating device (for example, the above-described identification data, or the like) acquired from the operating device as an external device.

In addition, the information processing device according to the present embodiment further includes, for example, an audio output unit (not shown) that can output sounds, and may notify a user of a timing at which the battery 102 is to be charged using the sounds. Herein, as the audio output unit (not shown), for example, a DSP, or an audio output device is exemplified. When the audio output unit (not shown) is included, for example, the display control unit 114 causes the audio output unit (not shown) to output a sound indicating the timing at which the battery is to be charged by transferring audio data indicating the timing at which the battery is to be charged to the audio output unit (not shown).

Note that the configuration of the information processing device according to the present embodiment is not limited to the configuration in which the display control unit 114 controls the audio output unit (not shown) to output the sound indicating the timing at which the battery 102 is to be charged. For example, the information processing device according to the present embodiment may further include an audio control unit (not shown), and the audio control unit (not shown) may control the audio output unit (not shown) to output the sound indicating the timing at which the battery 102 is to be charged. In addition, the display control unit 114 or the audio control unit (not shown) included in the information processing device according to the present embodiment can transmit audio data indicating a timing at which the battery is to be charged to an external device regardless of, for example, the inclusion of the audio output unit (not shown) in the information processing device according to the present embodiment.

As described above, the information processing device according to the present embodiment performs, for example, the process (1) (detection process) to the process (3) (display control process) which are described above as the processes relating to the information processing method according to the present embodiment. Herein, the information processing device according to the present embodiment sets one symbol in which information corresponding to characteristics (characteristics of a battery and an operating device that operates using electric power obtained from the battery) detected in the process (1) (detection process) described above is reflected in the process (2) (symbol setting process) described above. Then, the information processing device according to the present embodiment causes the set symbol to be displayed in the process (3) (display control process) described above.

Accordingly, the information processing device according to the present embodiment can allow a user to ascertain information indicating the characteristics of the battery and the operating device that operates using electric power obtained from the battery using one symbol.

In addition, the information processing device according to the present embodiment can set the symbol that includes an icon depicting the shape of the operating device and a display relating to the remaining capacity of the battery (in the examples of FIGS. 1 to 5, the remaining travel distance corresponds to the display) based on the characteristics of the battery and the operating device as shown in, for example, FIGS. 1 to 5. By setting the symbol as described above, the information processing device according to the present embodiment can cause the symbol giving a feeling of familiarity and reality to be displayed in a display region.

In addition, since the information processing device according to the present embodiment can set a symbol that includes an icon designed by a user, or the like, the device can cause the symbol giving a feeling of deeper familiarity to be displayed in a display region. In addition, with the set symbol that includes the icon designed by a user, or the like, the user can more easily understand the content indicated by the symbol displayed in the display region.

In addition, since the information processing device according to the present embodiment can allow a user to ascertain information indicating characteristics of a battery and an operating device that operates using electric power obtained from the battery using one symbol, a user can ascertain the characteristic of the battery in more detail than when the remaining capacity of the battery is displayed in stages as disclosed in, for example, JP 2005-164250A.

Further, the information processing device according to the present embodiment can notify a user of a timing at which the battery is to be charged, for example, in a visual and/or auditory manner based on information corresponding to detected characteristics. With the notification of the timing at which the battery is to be charged from the information processing device according to the present embodiment, a user can ascertain the timing at which the battery is to be charged. Thus, by causing the information processing device according to the present embodiment to notify of the timing at which the battery is to be charged, usability for a user can be improved.

Hereinabove, description has been provided exemplifying the information processing device for the present embodiment, but the embodiment is not limited thereto. The embodiment can be applied to, for example the operating device and the battery according to the present embodiment. In addition, the present embodiment can be applied to various devices, for example, a computer such as a PC or a server, a communication device such as a mobile telephone or a smartphone, a video/music reproducing device (or video/music recording and reproducing device), and a game device. Further, the embodiment can be applied to, for example, the operating device according to the present embodiment, the battery according to the present embodiment, and a processing IC (Integrated Circuit) that can be incorporated into the devices described above.

In addition, description has been provided exemplifying the operating device for the present embodiment, but the embodiment is not limited thereto. The embodiment can be applied to moving objects that are driven by electric power, for example, an electric automobile, an electric motorcycle, an electric bicycle, a hybrid car, an electric bus, a tram, and the like, and various devices that operate using electric power supplied from a battery including a computer such as a PC, a communication device such as a mobile telephone or a smartphone, a video/music reproducing device (or a video/music recording and reproducing device), a portable game device, and the like.

In addition, description has been provided exemplifying the battery for the present embodiment, but the embodiment is not limited thereto. The embodiment can be applied to, for example, a battery such as a primary battery for which charging is difficult, and a battery such as a secondary battery for which charging and discharging are practically possible. Further, the embodiment may be applied to a disposable battery or a rental battery (including one that is not charged even though it can be charged).

(Program According to Present Embodiment)

A user can ascertain information indicating characteristics of a battery and an operating device that operates using electric power obtained from the battery using one symbol by executing a program for causing a computer to function as the information processing device according to the present embodiment (a program that can execute the processes according to the information processing method according to the present embodiment, for example, from the process (1) (detection process) to the process (3) (display control process) which are described above) in the computer.

Hereinabove, the preferred embodiment of the present disclosure has been described in detail with reference to the accompanying drawings, but the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the above description shows that the program (computer program) for instructing a computer to function as the information processing device according to the present embodiment is provided, but further in the embodiment, a recording medium in which the program is stored can also be provided.

The above-described configuration shows an example of the embodiment, and of course belongs to the technical scope of the present disclosure.

Additionally, the present technology may also be configured as below.

(1) An information processing device including:
 a characteristic detection unit that detects a characteristic of a battery and a characteristic of an operating device that operates using electric power obtained from the battery;
 a symbol setting unit that sets one symbol on which information corresponding to the detected characteristics is reflected; and
 a display control unit that causes the set symbol to be displayed.

(2) The information processing device according to (1), wherein, when a change in the characteristic of the battery or a change in the characteristic of the operating device is detected, the symbol setting unit updates the symbol based on the detected change of the characteristic, and
 wherein the display control unit causes the updated symbol to be displayed.

(3) The information processing device according to (1) or (2), wherein the information corresponding to the characteristics includes one or more pieces of information among information set in advance to correspond to each characteristic, information obtained by changing the information set in advance, and information newly set based on a user operation.

(4) The information processing device according to any one of (1) to (3), wherein the information corresponding to the characteristics includes information indicating at least one of a time during which the operating device is capable of operating using electric power obtained from the battery and a distance for which the operating device is capable of moving using electric power obtained from the battery when the operating device is a moving object.

(5) The information processing device according to any one of (1) to (4), wherein the symbol setting unit sets the symbol on which information corresponding to the characteristics is reflected based on a reference corresponding to the battery.

(6) The information processing device according to any one of (1) to (4), wherein the symbol setting unit sets the symbol on which information corresponding to the characteristics is reflected based on a reference independent of the battery.

(7) The information processing device according to any one of (1) to (6), wherein the information processing device is the operating device.

(8) The information processing device according to (7), wherein the operating device is a moving object.

(9) The information processing device according to any one of (1) to (6), wherein the information processing device is the battery.

(10) An information processing method including:
 detecting a characteristic of a battery and a characteristic of an operating device that operates using electric power obtained from the battery;
 setting one symbol on which information corresponding to the detected characteristics is reflected; and
 causing the set symbol to be displayed.

(11) A program for causing a computer to execute:
 detecting a characteristic of a battery and a characteristic of an operating device that operates using electric power obtained from the battery;
 setting one symbol on which information corresponding to the detected characteristics is reflected; and
 causing the set symbol to be displayed.

The present disclosure contains subject matter related to that disclosed in Japanese Priority Patent Application JP 2012-092874 filed in the Japan Patent Office on Apr. 16, 2012, the entire content of which is hereby incorporated by reference.

What is claimed is:

1. An information processing device comprising:
 a characteristic detection unit that detects a characteristic of a battery and a characteristic of an automobile that operates using electric power obtained from the battery;
 a symbol setting unit that sets an image of emission gas of the automobile as a symbol, on which information corresponding to the detected characteristics of the battery and the automobile is reflected; and
 a display control unit that causes the set symbol to be displayed,
 wherein the symbol setting unit changes a length of the emission gas in the image to indicate a remaining travel distance for which the automobile is capable of moving using the electric power obtained from the battery.

2. The information processing device according to claim 1, wherein,
 when a change in the characteristic of the battery or a change in the characteristic of the automobile is detected, the symbol setting unit updates the symbol based on the detected change of the characteristic of the battery or the detected change of the characteristic of the automobile, and
 wherein the display control unit causes the updated symbol to be displayed.

3. The information processing device according to claim 1, wherein
the information corresponding to the detected characteristics of the battery and the automobile comprise one or more of: information set in advance to correspond to each characteristic, information obtained by changing the information set in advance, and information newly set based on a user operation.

4. The information processing device according to claim 1, wherein
the information corresponding to the detected characteristic of the automobile comprise information indicating at least one of a time during which the automobile is capable of operating using the electric power obtained from the battery and the remaining distance for which the automobile is capable of moving using the electric power obtained from the battery.

5. The information processing device according to claim 1, wherein
the symbol setting unit sets the symbol, on which the information corresponding to the detected characteristics of the battery and the automobile is reflected, based on a reference corresponding to the battery.

6. The information processing device according to claim 1, wherein
the symbol setting unit sets the symbol, on which the information corresponding to the detected characteristics of the battery and the automobile is reflected, based on a reference independent of the battery.

7. The information processing device according to claim 1, wherein
the information processing device is the automobile.

8. The information processing device according to claim 1, wherein
the information processing device is the battery.

9. The information processing device according to claim 1, wherein
the symbol setting unit enables a user to select the symbol on which the information corresponding to the detected characteristics of the battery and the automobile is reflected.

10. An information processing method comprising:
detecting a characteristic of a battery and a characteristic of an automobile that operates using electric power obtained from the battery;
setting an image of a light beam emitted from the automobile as a symbol, on which information corresponding to the detected characteristics of the battery and the automobile is reflected; and
causing the set symbol to be displayed,
wherein a length of the light beam in the image is changed to indicate a remaining travel distance for which the automobile is capable of moving using the electric power obtained from the battery.

11. A non-transitory computer readable storage medium having stored thereon, a computer program having at least one code section executable by a computer, thereby causing the computer to perform steps comprising:
detecting a characteristic of a battery and a characteristic of an automobile that operates using electric power obtained from the battery;
setting an image of emission gas of the automobile as a symbol, on which information corresponding to the detected characteristics of the battery and the automobile is reflected; and
causing the set symbol to be displayed,
wherein a length of the emission gas in the image is changed to indicate a remaining travel distance for which the automobile is capable of moving using the electric power obtained from the battery.

* * * * *